April 13, 1965 J. E. MILLS 3,177,572
APPARATUS AND METHOD FOR VALVE REPAIR
Filed Aug. 2, 1963

INVENTOR.
JACK E. MILLS
BY
*Donald J. Ellingsberg*
AGENT

United States Patent Office 3,177,572
Patented Apr. 13, 1965

3,177,572
APPARATUS AND METHOD FOR VALVE REPAIR
Jack E. Mills, Santa Susana, Calif., assignor to
North American Aviation, Inc.
Filed Aug. 2, 1963, Ser. No. 299,525
10 Claims. (Cl. 29—401)

The present invention relates to an apparatus and method for repairing valves, and more particularly to an apparatus and method for seating wedges in valves.

A large number of valves, particularly gate valves, are used in chemical and petroleum process plants as well as in various power plant systems. These valves are frequently welded into the system lines and when the valves fail or leak through, the line must be cut to remove the failed valve and a new valve rewelded into the line. Where a system handles volatile liquids, acids, caustics, and the like, necessary safety procedures multiply the procedure normally associated with the process of valve removal and replacement. Valve removal and replacement under these conditions is costly, and the cost is even higher where steam tracing and/or insulation replacements are involved.

It has been determined that many of these failed valves have an inadequate seating pattern between the valve wedge and the seating rings. This causes leak-through, particularly in gate valves. Improved seating or contact between the wedge and the seat rings, at least on one side of the wedge, could remedy many of the presently failed valves and eliminate the costly replacement thereof.

Accordingly, it is an object of the present invention to provide a new and improved apparatus and method for repairing valves.

Another object of the present invention is to provide a new and improved apparatus and method for developing an adequate seating pattern between a valve wedge and associated seating rings.

An additional object of the invention is to provide an apparatus and method for developing a seating pattern having high integrity in a gate valve.

Likewise an object of the invention is to provide a new and improved apparatus and method for repairing valves in place without removal from a system.

Figure 1:
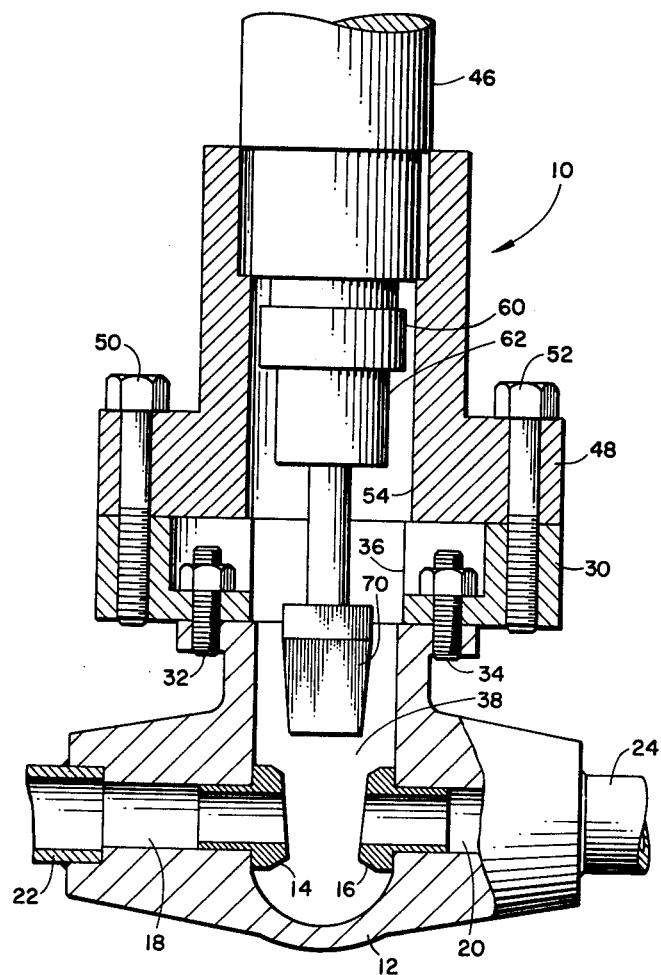
Figure 2:
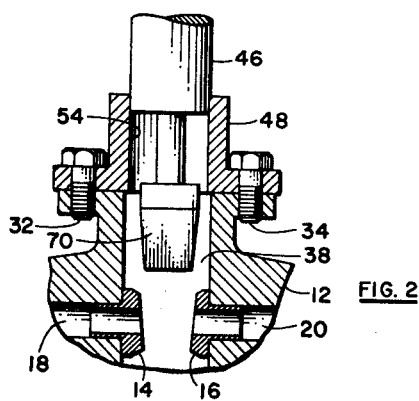

Further objects, features, and the attending advantages of the invention will be apparent with regard to the following description read in conjunction with the accompanying drawing in which:

FIGURE 1 is a sectional side elevation, partly broken away, of one form of the valve repair apparatus formed in accordance with the invention and positioned in relation to a conventional gate valve body; and FIGURE 2 is a sectional side elevation, partly broken away, of another form of the valve repair apparatus.

Briefly, in accordance with the invention, a new and improved apparatus and method are provided for the repair of a valve without removal from a system by the fitting of a valve wedge under applied pressure into seating contact with associated valve seat rings so that a leak tight seating pattern results on at least one side of the wedge.

The new and improved apparatus and method of the present invention forces the valve wedge between the valve seat rings which either eliminates scratches across the seat rings or repositions the seat rings to insure a leak-tight valve. The swaging or flowing of the seat rings to develop an acceptable seating pattern is enhanced where the Brinell number of the valve wedge is greater than the seat rings.

Referring to FIGURE 1, one specific embodiment of the new and improved valve repair apparatus 10 is secured to valve body 12 of a conventional gate valve. The valve bonnet, wedge, gasket and related valve hardware, all not shown, are removed from valve body 12 prior to the attachment of the valve repair apparatus 10 of the present invention. Valve body 12 has conventional valve seats 14 and 16 associated with fluid flow passages 18 and 20. Fluid system pipes 22 and 24 may be welded or suitably connected to valve body 12 in accordance with known procedures. Additional coating and insulating materials which may be positioned about both the pipes 22 and 24, and the valve body 12 have been omitted from the drawing for clarity.

The valve repair apparatus 10 is fitted to the valve body 12 by a valve bonnet adaptor plate 30. The adaptor or index plate 30 is particularly sized to the gate valve so that the valve repair apparatus of the invention is adapted to fit gate valves of various sizes. Adaptor plate 30 is secured to valve body 12 by a plurality of circumferentially spaced bolts, studs or the like, such as studs 32 and 34, so that aperture 36 is in general alignment with chamber 38 in the valve body 12.

A ram 46 of a force generating means, such as a hydraulic press or the like, not shown, is supported and positioned by a suitable frame 48. Frame 48 is adjustably secured to adaptor plate 30 by a plurality of circumferentially spaced cap screws or the like, such as screws 50 and 52, so that bore 54 is generally aligned with aperture 36 of plate 30. An adaptor cap 60 and adaptor member 62 cooperate to transmit developed pressure from the ram 46 to a conventional valve wedge 70. Valve wedge 70 is removably supported at the end of adaptor member 62, e.g. by a suitable key portion and keyway arrangement, not shown.

The valve repair apparatus 10, in the illustrated embodiment, facilitates the placement of a new valve wedge, such as wedge 70, in a gate valve body 12 or the repositioning of the valve seats with respect to an existing wedge, where the wedge is acceptable. When the valve repair apparatus 10 is positioned on the gate valve body 12, the use of the apparatus in seating a wedge, such as wedge 70, or in repositioning the valve seats, such as seats 14 and 16, in the valve body may include the following steps.

Adaptor plate 30 is secured to the valve body 12 which has been thoroughly cleaned of foreign material, particularly in the area of the valve seats 14 and 16. The valve wedge 70 is preferably coated with a recording film, such as non-drying Prussian blue or the like, and suitably positioned on the end of adaptor member 62. The wedge 70 is then placed within the valve body 12 and oriented with respect to the valve seats 14 and 16. Frame member 48 is secured to the adaptor plate 30 and controlled pressure is applied to the valve wedge 70 by means of the ram 46 acting through the interconnecting adaptor cap 60 and adaptor member 62. The applied pressure causes the valve wedge to forcibly impinge upon the associated valve seats and swage the seats to eliminate any scratches or the like therein.

When a predetermined first pressure step has been reached, the pressure is released and frame member 48 is removed from the adaptor plate 30. Wedge 70 is also removed from the valve body 12 and a visual determination is made of the Prussian blue valve seat impression or pattern thereon for continuities. A 100% impression on at least one side of the valve wedge 70, or a preferred 100% impression on both sides of the wedge, indicates that the swaging action has developed an acceptable seat impression and the valve can be returned to service.

Where the seat impression on one or both sides of the wedge 70 is not 100%, the valve repair apparatus 10 is relocated and resecured to the valve body 12 as described. Pressure is again applied to the wedge and increased beyond the initial pressure step in a controlled manner to a predetermined second pressure step. After the pressure is released and the repair apparatus removed, the seat impression on the valve wedge is again inspected. The condition of the specific valve being repaired determines whether the preceding sequence should be repeated through sequentially increased pressure steps. If a satisfactory seating pattern is unattainable or if the valve is found to require further rework, conventional repair methods are employed, i.e. removal and replacement, etc.

The following examples are given as an indication of the operating parameters found desirable for one valve repair apparatus similar to the embodiment illustrated by FIGURE 1. These examples are offered to assure a working understanding of the present invention and are not to be interpreted as limiting the scope of the invention.

One type of gate valve that has been successfully repaired without removal from the system has a valve wedge of 410 stainless steel with 12% chromium, and a Brinell hardness number (BHN) of 320. The valve seats in these valves are of nickel alloy, 175 BHN. The previously described swaging or flowing of the valve seats under the forcible impingement of the valve wedge is enhanced where the BHN of the valve wedge is greater than the valve seats. Using a hydraulic pump which delivers up to 10,000 p.s.i., and a hydraulic ram with an effective ram area of 2.2365 square inches, the following seating pressures were applied to the wedges:

| Valve Size (in.) | Indicated Pump Pressure (p.s.i.) | × Effective Ram Area (sq. in.) | = Actual Ram Pressure (lbs.) |
|---|---|---|---|
| ½ | 2,500 | 2.2365 | 5,591 |
| ¾ | 2,500 | 2.2365 | 5,591 |
| 1 | 3,000 | 2.2365 | 6,709 |
| 1¼ | 3,500 | 2.2365 | 7,828 |
| 1½ | 5,000 | 2.2365 | 11,182 |
| 2 | 5,000 | 2.2365 | 11,182 |

The above gate valves repaired by the new and improved apparatus and method of the present invention have been in continuous use since repair without requiring additional reseating or costly replacement.

FIGURE 2 shows another embodiment of the valve repair apparatus of my invention. The same reference characters are used to indicate corresponding parts previously described in view of FIGURE 1.

FIGURE 2 differs from FIGURE 1 in that the frame 48 is adjustably secured to the valve body 12 without an intermediate adaptor plate, such as plate 30 as shown by FIGURE 1. Further, the ram 46 is adapted to act directly upon the valve wedge 70 without an intermediate adaptor cap and adaptor member, such as cap 60 and adaptor member 62. However, the operation of the valve repair apparatus shown by FIGURE 2 is the same as that described for the apparatus of FIGURE 1, and the results obtained are substantially similar.

While specific embodiments of the invention have been illustrated, and specific examples of procedure have been described, it is contemplated that other modifications and applications which are not limited to the particular details of the illustrated embodiments will occur to those skilled in the art. It is therefore intended that the appended claims shall cover such modifications and applications which do not depart from the true spirit and scope of the invention.

Having described the invention, what I claim as new and desire to secure by Letters Patent is:

1. The method of inserting a tapered valve wedge into a valve seat of a valve body comprising:
    (a) positioning the wedge in the valve seat region,
    (b) applying controlled pressure to the wedge, and
    (c) continuing the application of sufficient controlled pressure to swage at least one of the valve seats by the impinging valve wedge, thereby obtaining a leak-tight valve seat.

2. The method of inserting a tapered valve wedge into a valve seat region in a valve body for repair of the valve comprising:
    (a) providing driving means in association with the valve body,
    (b) securing the wedge to said driving means,
    (c) aligning the wedge in the valve seat region,
    (d) actuating the driving means to apply controlled pressure to the wedge, and
    (e) continuing the application of sufficient controlled pressure by said driving means to the wedge, said pressure being sufficient to swage at least one valve seat and develop an acceptable leak-tight valve seat pattern.

3. The method of inserting a tapered valve wedge into a valve seat region in a valve body for repair of the valve comprising:
    (a) coating the wedge with a suitable recording film,
    (b) positioning the coated wedge in the valve seat region,
    (c) applying sufficient controlled pressure to swage the wedge against at least one valve seat in the valve region,
    (d) sequentially removing said pressure and the wedge from the valve body, and
    (e) determining the continuities in the valve seat pattern formed in said recording film by the assocaited valve seat to establish the acceptable seating of the valve wedge.

4. A repair apparatus for a valve body comprising:
    (a) guide means connected to the valve body,
    (b) force generating means positioned by said guide means, and
    (c) a tapered valve wedge acted upon by said force generating means in a controlled direction toward at least one valve seat in the valve body,
    (d) said force generating means applying a controlled pressure of sufficient force to said tapered valve wedge in said controlled direction so that said force swages said valve seat and develops an acceptable leak tight valve seat pattern.

5. A repair apparatus for a valve body comprising:
    (a) adjustable frame means connected to the valve body,
    (b) force generating means positioned by said adjustable frame means,
    (c) a tapered valve wedge, and
    (d) adaptor means connecting said force generating means and said wedge,
    (e) said force generating means applying a controlled pressure of sufficient force to said wedge in a controlled direction toward at least one valve seat in the valve body so that said force swages said valve seat.

6. A repair apparatus for a valve body comprising:
    (a) adaptor plate means connected to the valve body,
    (b) a suitable aperture in said plate means generally aligned with a fluid chamber in the valve body,
    (c) adjustable frame means connected to said plate means,
    (d) force generating means positioned by said frame means, and
    (e) a tapered valve wedge acted upon by said force generating means in a controlled direction toward at least one valve seat in the valve body,
    (f) said force generating means applying controlled pressure of sufficient force to said tapered valve wedge in such controlled direction so that said force swages said valve seat.

7. A repair apparatus for a valve body comprising:
    (a) adaptor plate means connected to the valve body,
    (b) a suitable aperture in said plate means generally aligned with a fluid chamber in the valve body,
    (c) adjustable frame means connected to said plate means, (d) force generating means positioned by said frame means,
(e) a tapered valve wedge, and
(f) adaptor means connecting said force generating means and said wedge,
(g) said force generating means applying a controlled pressure of sufficient force to said wedge in a controlled direction toward at least one valve seat in the valve body so that said force swages said valve seat.

8. The valve repair apparatus of claim 7 in which said frame means has a bore generally aligned with said plate aperture to receive said force generating means.

9. A repair apparatus for a valve body comprising:
(a) an adaptor plate connected to the valve body,
(b) a central aperture in said plate generally aligned with an open fluid chamber in the valve body,
(c) an adjustable frame member connected to said adaptor plate,
(d) a bore in said frame member generally aligned with said central aperture,
(e) a ram positioned by said frame member and adapted to extend into said bore,
(f) a tapered valve wedge, and
(g) an adaptor member connecting said ram and said wedge,
(h) said ram being actuated to apply a controlled pressure of sufficient force to said wedge in a controlled direction toward at least one valve seat in the fluid chamber of the valve body so that said force swages said valve seat and develops an acceptable leak tight valve seat pattern.

10. The repair apparatus of claim 9, in which an adaptor cap member is positioned intermediate said ram and said adaptor member.

References Cited by the Examiner
UNITED STATES PATENTS

| 594,634 | 11/97 | Lunken | 251—274 |
| 2,627,651 | 2/53 | MacGregor | 29—157.1 |

WHITMORE A. WIRTZ, *Primary Examiner.*

THOMAS H. EAGER, *Examiner.*